(12) United States Patent
Chen

(10) Patent No.: US 11,895,986 B1
(45) Date of Patent: Feb. 13, 2024

(54) CONNECTING BELT, PET VEST AND WEARABLE PRODUCT

(71) Applicant: Shenzhen Abel Technology Co., Ltd., Guangdong (CN)

(72) Inventor: Hua Chen, Guangdong (CN)

(73) Assignee: Shenzhen Abel Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/098,689

(22) Filed: Jan. 18, 2023

(30) Foreign Application Priority Data

Aug. 17, 2022 (CN) .......................... 202222166739.2

(51) Int. Cl.
*A01K 27/00* (2006.01)

(52) U.S. Cl.
CPC .......... *A01K 27/002* (2013.01); *A01K 27/005* (2013.01)

(58) Field of Classification Search
CPC .... A01K 27/002; A01K 27/00; A01K 27/001; A01K 27/003
See application file for complete search history.

(56) References Cited

U.S. PATENT DOCUMENTS

| | | | | |
|---|---|---|---|---|
| 719,924 A | * | 2/1903 | Westcott | A41H 1/02 33/2 R |
| 899,802 A | * | 9/1908 | Couture | A41H 1/02 33/2 R |
| 1,784,888 A | * | 12/1930 | Couture | A41H 1/02 33/15 |
| 3,685,155 A | * | 8/1972 | Oblander | A41H 1/02 116/200 |
| 9,907,345 B2 | * | 3/2018 | O'Neill | A41F 1/002 |
| 2010/0011487 A1 | * | 1/2010 | Kim | A41F 9/002 2/311 |
| 2015/0237938 A1 | * | 8/2015 | O'Neill | A41F 1/002 2/322 |
| 2022/0408696 A1 | * | 12/2022 | Craddock | A01K 27/002 |

* cited by examiner

Primary Examiner — Kristen C Hayes

(57) ABSTRACT

The present disclosure provides a connecting belt, a dog vest, and a wearable product. The connecting belt includes a plurality of position marks, an interval is defined between each two adjacent position marks, and the intervals are arranged along a length direction of the connecting belt and configured to mark a length of the connecting belt when adjusting.

12 Claims, 13 Drawing Sheets

CONNECTING BELT, PET VEST AND WEARABLE PRODUCT

CROSS REFERENCE TO RELATED APPLICATIONS

The present application claims the benefit of Chinese Patent Application No. 202222166739.2 filed on Aug. 17, 2022, the contents of which are incorporated herein by reference in their entirety.

FIELD

The present disclosure relates to the technical field of wearable products, specifically to a connecting belt, a pet vest applying the connecting belt, and a wearable product.

BACKGROUND

With the development of society, wearable products are more and more popularly. Wearing product includes a pet wearable product (such as brace, collar, leash, etc.), an outdoor wearable product (such as a protective safety belt, a mountaineering backpack, a personal protective product, etc.), a military product (such as a fire protection product, a parachute, a military backpack, etc.), a luggage product (such as a gift box, a bag, a handbag, a luggage, etc.), a clothing product (such as a watch, a wrist strap, a clothing accessory, a girdle, etc.), an electronic device and a lanyard (such as a mobile phone, a lanyard for camera, MP3, MP4, or U disk, a lanyard for a certificate, a woven key chain, etc.), etc. As a connecting member, the connecting belt is widely used in the wearable products.

For a product with only one connecting belt, the length or the range of the connecting belt cannot be accurately and conveniently adjusted, so user needs to attempt repeatedly. For a product with at least two symmetrical connecting belts, after the length of a first connecting belt is adjusted, a second connecting belt (or other connecting belts) cannot be accurately adjusted to the same length. User needs to attempt and adjust many times, but it difficult to adjust the two (or several) connecting belts to the same length or the symmetrical positions after being adjusted.

Therefore, it is necessary to provides a new wearable product to solve the above-mentioned problems.

SUMMARY

The present disclosure aims to provide a connecting belt, a pet vest, and a wearable product. The length or range of the connecting belt can be accurately adjusted, to avoid the problem that the lengths of the existing connecting belts are different after adjusted, further to improve the wearing comfort and ensure the wearing standardization.

A connecting belt is applied to a wearable product, the connecting belt includes a plurality of position marks, an interval is defined between each two adjacent position marks, and the intervals are arranged along a length direction of the connecting belt and configured to mark a length of the connecting belt when adjusting.

A pet vest includes a body and at least one connecting belt connected with the body, the at least one connecting belt includes a plurality of position marks, an interval is defined between each two adjacent position marks, and the intervals are arranged along a length direction of the connecting belt and configured to mark a length of the connecting belt when adjusting.

A wearable product includes a connecting belt, the connecting belt includes a plurality of position marks, an interval is defined between each two adjacent position marks, and the intervals are arranged along a length direction of the connecting belt and configured to mark a length of the connecting belt when adjusting.

BRIEF DESCRIPTION OF THE DRAWINGS

Implementations of the present disclosure will now be described, by way of embodiment, with reference to the attached FIGS. It should be understood, the drawings are shown for illustrative purpose only, for ordinary person skilled in the art, other drawings obtained from these drawings without paying creative labor by an ordinary person skilled in the art should be within scope of the present disclosure.

Figure 1:
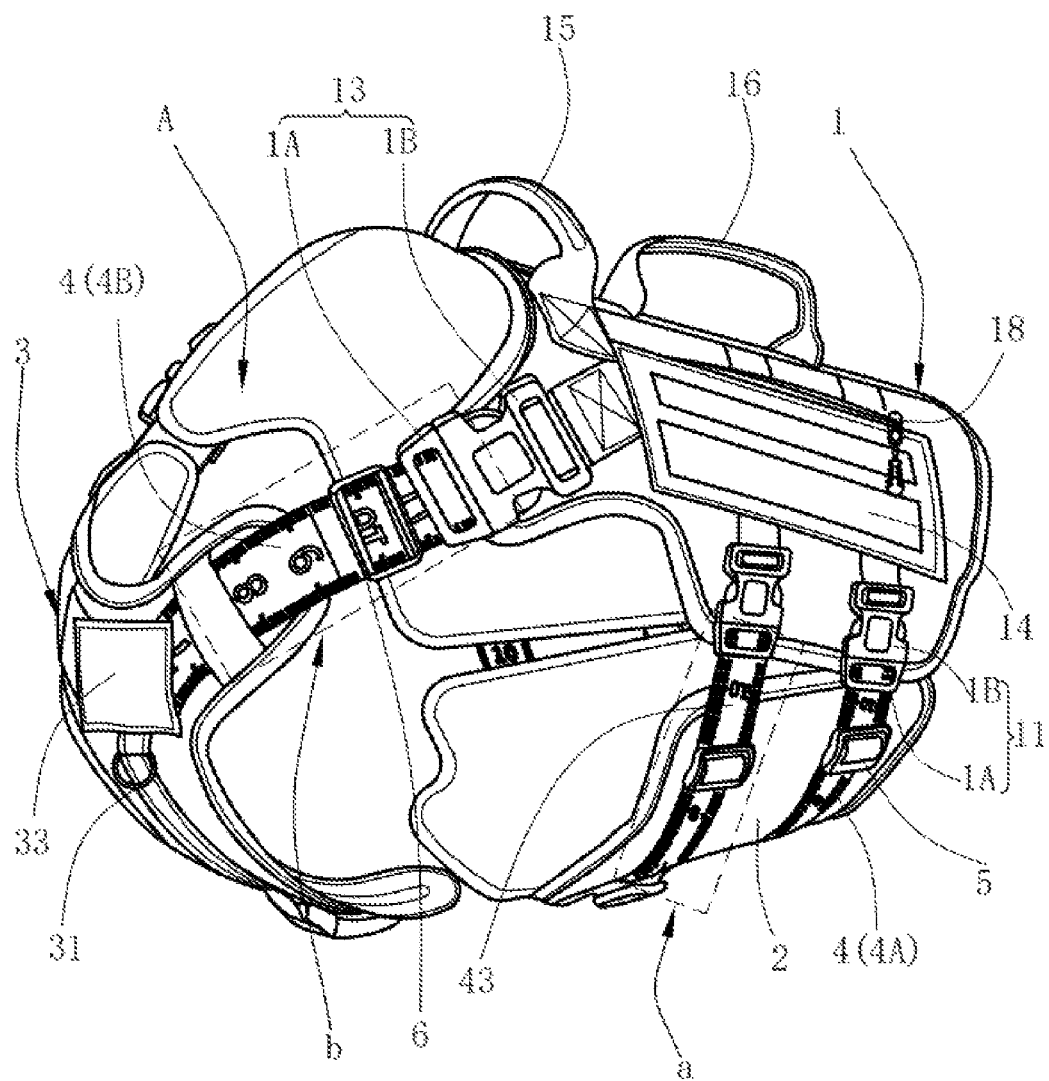
FIG. 1 is a structure diagram of a dog vest according to a first embodiment of the present disclosure.

The realization of the aim, functional characteristics, advantages of the present disclosure are further described specifically with reference to the accompanying drawings and embodiments.

DETAILED DESCRIPTION

The technical solutions of the embodiments of the present disclosure will be clearly and completely described in the following with reference to the accompanying drawings. It is obvious that the embodiments to be described are only a part rather than all of the embodiments of the present disclosure. All other embodiments obtained by persons skilled in the art based on the embodiments of the present invention without creative efforts shall fall within the protection scope of the present invention.

It is to be understood that, all of the directional instructions in the exemplary embodiments of the present disclosure (such as top, down, left, right, front, back) can only be used for explaining relative position relations, moving condition of the elements under a special form (referring to figures), and so on, if the special form changes, the directional instructions change accordingly. Especially, when the connecting belts are used for the pet wearable products, because the pets can't communicate with people effectively, it's more difficult to adjust the symmetrical positions.

In addition, the descriptions, such as the "first", the "second" in the present disclosure, can only be used for describing the aim of description, and cannot be understood as indicating or suggesting relative importance or impliedly indicating the number of the indicated technical character. Therefore, the character indicated by the "first", the "second" can express or impliedly include at least one character. In addition, the technical proposal of each exemplary embodiment can be combined with each other, however the technical proposal must base on that the ordinary skill in that art can realize the technical proposal, when the combination of the technical proposals occurs contradiction or cannot realize, it should consider that the combination of the technical proposals does not exist, and is not contained in the protection scope required by the present disclosure.

The present disclosure provides a wearable product, which includes a pet wearable product (such as brace, collar, leash, etc.), an outdoor wearable product (such as a protective safety belt, a mountaineering backpack, a personal protective product, etc.), a military product (such as a fire protection product, a parachute, a military backpack, etc.), a luggage product (such as a gift box, a bag, a handbag, a luggage, etc.), a clothing product (such as a watch, a wrist strap, a clothing accessory, a girdle, etc.), an electronic device and a lanyard (such as a mobile phone, a lanyard for camera, MP3, MP4, or U disk, a lanyard for a certificate, a woven key chain, etc.), etc. Then present disclosure takes a dog vest (which belongs to the pet wearable product) as an example to illustrate the connecting belt of the wearable product, the length or the range of the connecting belt can be accurately adjusted, so as to avoid the problem that the lengths of the connecting belts are different after adjusted, further to improve the wearing comfort and ensure the wearing standardization. The specific description is as shown in Embodiments 1 to 3. Of course, the connecting belts described in the following embodiments may not be limited to the dog vest, and may also be used to other pet wearable products, such as cat vest, parrot vest, pig vest, etc.

Referring to FIGS. 1-4, the present disclosure provides a dog vest according to a first embodiment, the dog vest includes a body including a back portion 1 and an abdomen portion 2, and at least one connecting belt 4. The connecting belt 4 may be at least one selected from a group consisting of leather belt, woven belt, fabric belt, and the like. The vest may not be limited to the dog vest, and may also be cat vest, parrot vest, pig vest, etc.

The at least one connecting belt 4 includes at least one first connecting belt 4A and at least one second connecting belt 4B.

The back portion 1 is fixedly provided with four first detachable members 11, the first detachable member 11 may be a detachable buckle or a hook and loop fastener, the abdomen portion 2 is also connected with four first connecting belts 4A which are symmetrically arranged, and each first connecting belt 4A is connected with one corresponding first detachable member 11. The first connecting belt 4A is provided with a first adjusting member 5 for adjusting the length of the first connecting belt 4A, the first adjusting member 5 may be an adjusting buckle.

In the embodiment, the first detachable member 11 is a plug-in buckle which includes a plug-in end 1A and a recessed end 1B, the plug-in end 1A is detachably connected with the recessed end 1B. The first connecting belt 4A is connected with the plug-in end 1A of the first detachable member 11, and the recessed end 1B is fixed on the back portion 1.

The dog vest further includes a neck portion 3, the back portion 1 is further fixedly provided with two second detachable members 13, the second detachable member 13 may be a detachable buckle or a hook and loop fastener, the neck portion 3 is further provided with two second connecting belts 4B which are symmetrically arranged, and each second connecting belt 4B is connected with one corresponding the second detachable member 13. The second connecting belt 4B is provided with a second adjusting member 6 for adjusting the length of the second connecting belt 4B, the second first adjusting member 6 may be an adjusting buckle.

The second adjusting member 6 is a plug-in buckle having the same structure as the first adjusting member 5, that is, the second adjusting member 6 also includes a plug-in end 1A and a recessed end 1B detachably connected with the plug-in end 1A.

Before wearing the dog vest on the dog, the lengths of the first connecting belt 4A and the second connecting belt 4B are respectively adjusted by the first adjusting member 5 and the second adjusting member 6 according to the size of the dog; then the plug-in ends 1A of the first detachable members 11 and the second detachable members 13 are respectively connected with the recessed ends 1B, in this way, the dog wears the dog vest.

It should be understood that, in other embodiments, the first detachable member 11 can also be fixed on the abdomen portion 2, and the first connecting belt 4A is connected to the back portion 1 accordingly. The second detachable member 13 can also be fixed on the neck portion 3, and the second connecting belt 4B is connected to the back portion 1 accordingly.

It should be noted that in other embodiments, the quantity of the first detachable member 11 can be two, three, five, etc. Accordingly, the quantity of the first connecting belt 4A can also be set as two, three, five, etc. For example, when there are two first detachable members 11 and two first connecting belts 4A, one end of the abdomen portion 2 can be directly or indirectly connected with the back portion 1, and the other end of the abdomen portion 2 is connected with the back portion 1 by the first connecting belts 4A and the first detachable members 11. Similarly, the quantity of the second detachable member 13 can also be two, three, five, etc. Accordingly, the quantity of the second connecting belt 4B can also be two, three, five, etc.

The back portion 1 is fixedly provided with a sticking belt 14, and the sticking belt 14 can be a hook & loop fastener.

The back portion 1 is further fixedly provided with lifting rings 15 and 16. The lifting rings 15 and 16 provide additional or immediate controls to the dog, or help the dog enter the car.

The back portion 1 and the neck portion 3 can enclose a neck ring A, and an end of the back portion 1 close to the neck ring A is also fixedly provided with a connecting ring 17 for connecting the leash. The connecting ring 17 can evenly distribute the pressure from the leash on the chest of the dog, so that the dog will not suffocate during walking or jogging.

The back portion 1 is further provided with a pocket 18. The pocket 18 can store snacks, toys, and so on.

The neck portion 3 is further provided with a chest ring 31. The chest ring 31 may be attached with a label, or connected to the leash when walking the dog.

The neck portion 3 is further provided with a card bag 33. Dog's ID card or contact information card can be put in card bag 33.

The connecting belt 4 is provided with a plurality of position marks 41 arranged along the length direction of the connecting belt 4, and each two adjacent position marks 41 are set at a preset interval, to mark the length of the connecting belt 4. By arranging a plurality of position marks 41 in the length direction of the connecting belt 4 and setting each two adjacent position marks 41 at preset interval to mark the length of the connecting belt 4, the length of the connecting belt 4 can be properly adjusted by the first adjusting member 5 and the second adjusting member 6. When the connecting belt 4 is applied to wearable product, the length or range of the connecting belt 4 can be accurately adjusted, to avoid the problem that the lengths of the existing connecting belts are different after adjusted, further to improve the wearing comfort and ensure the wearing standardization.

Figure 2:
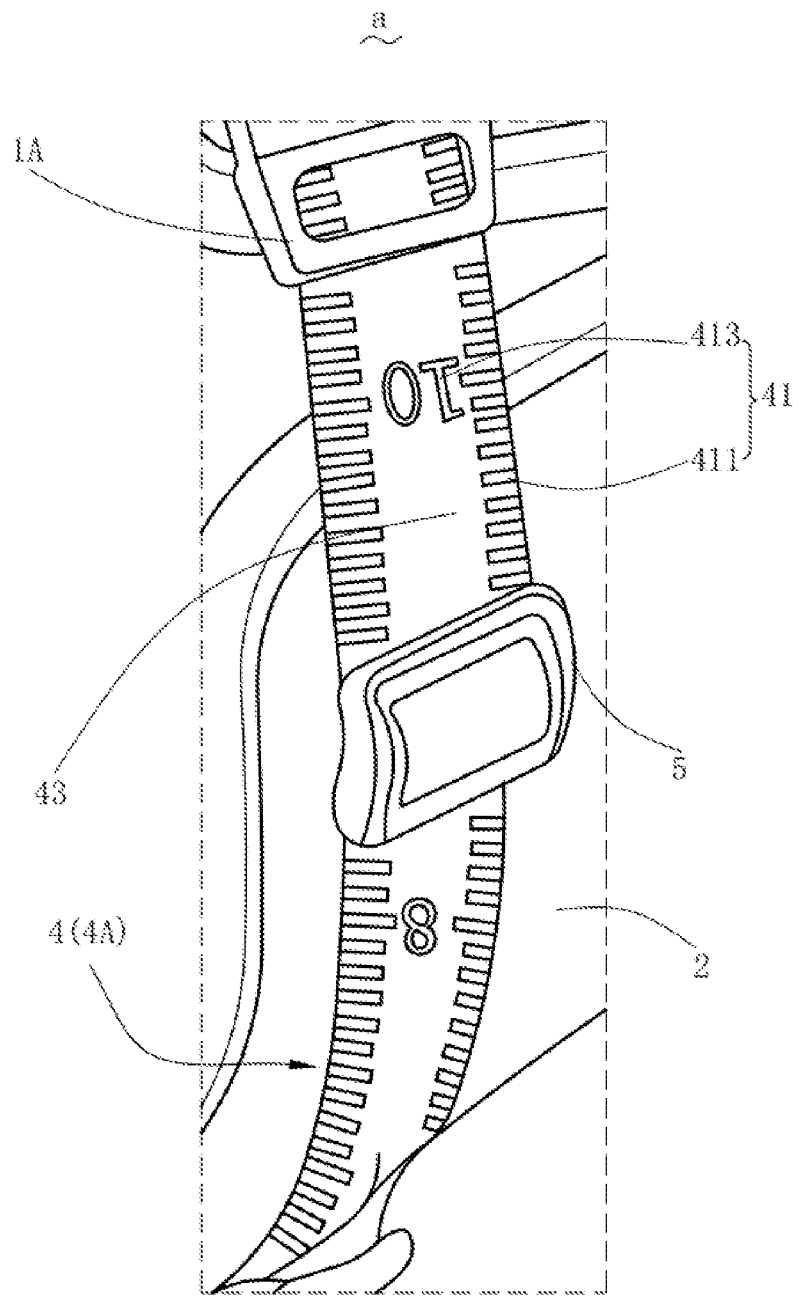
FIG. 2 is an enlarged diagram of portion a in FIG. 1.
Figure 3:
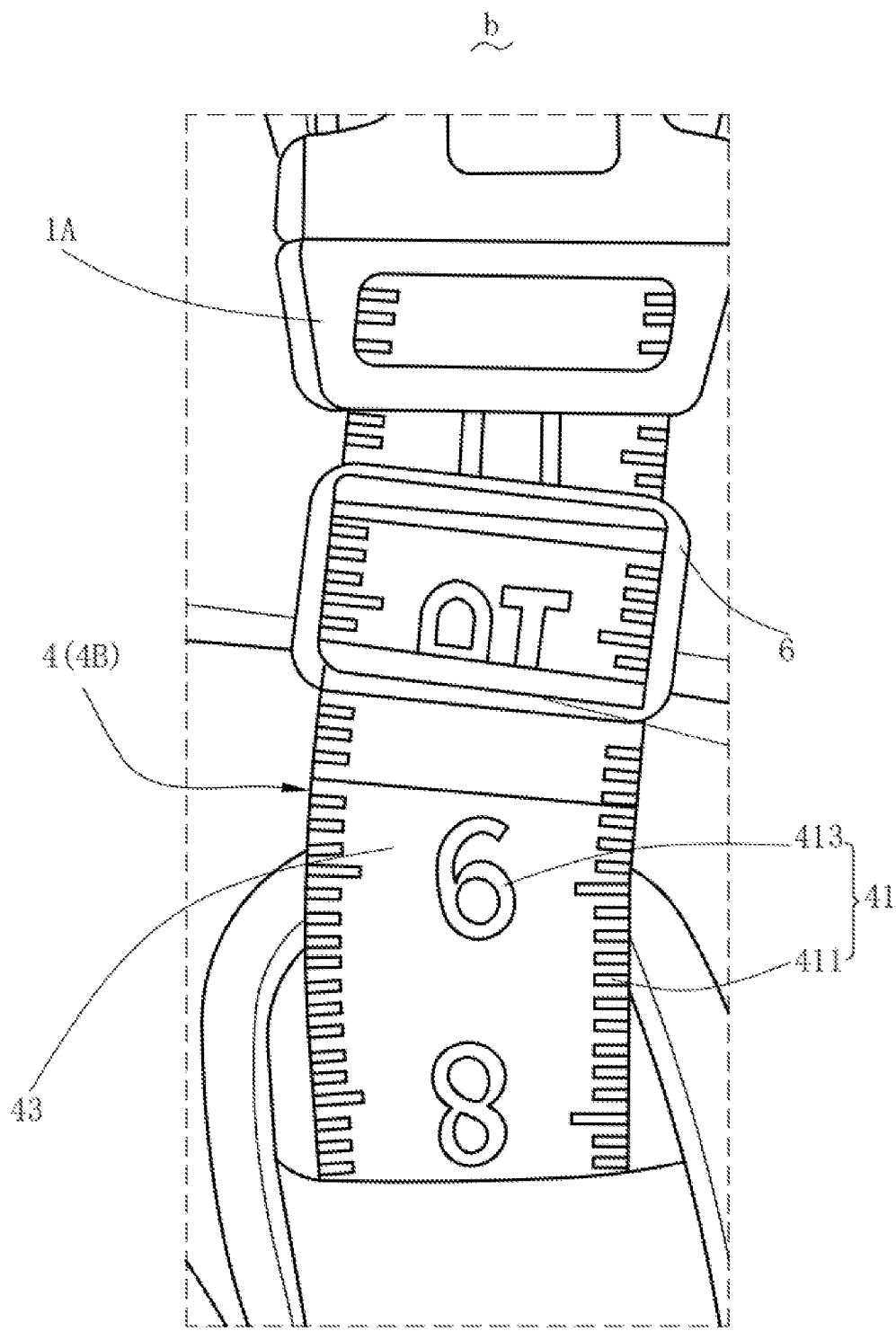
FIG. 3 is an enlarged diagram of portion b in FIG. 1.
Figure 4:
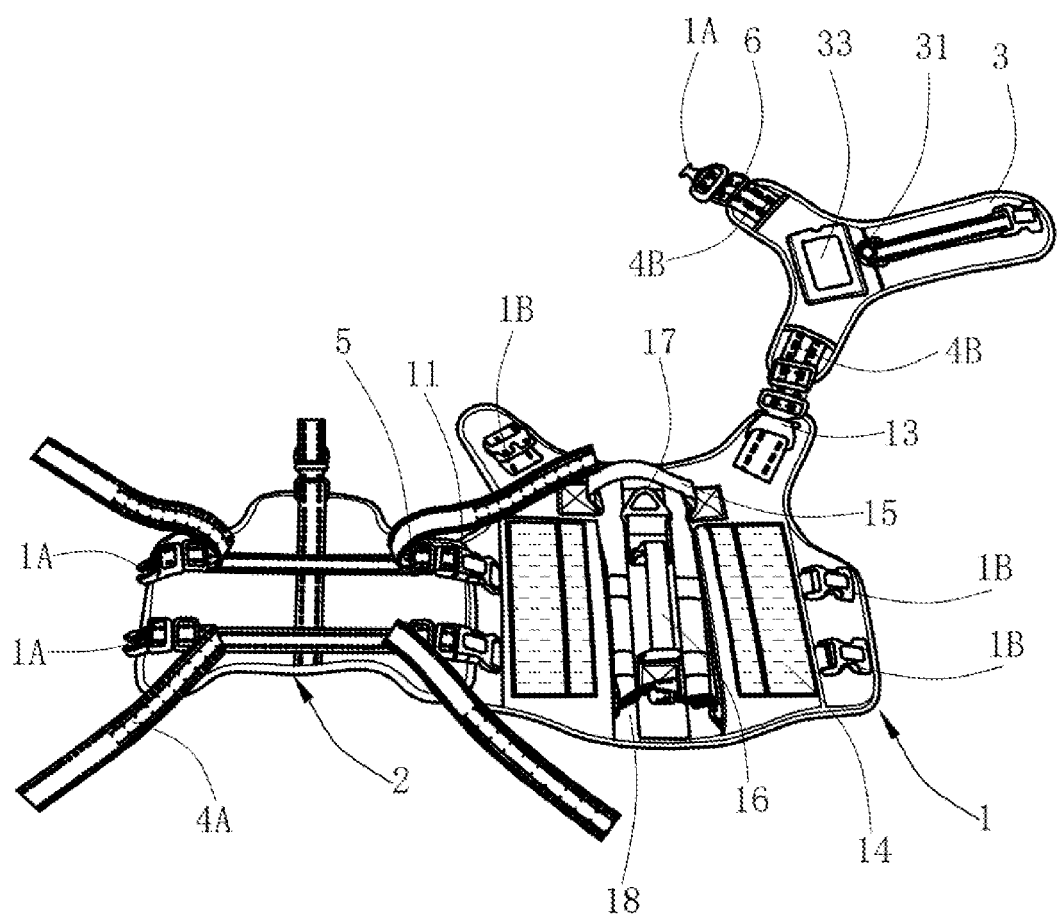
FIG. 4 is a structure diagram of the dog vest in FIG. 1, and the dog vest is in an unfolded state.

It should be noted that, the preset interval between two adjacent position marks 41 does not mean that any two adjacent position marks 41 have the same interval. Specifically, any two adjacent position marks 41 have the same interval or different intervals. As shown in FIGS. 2 and 3, multiple position marks 41 are set at equal intervals, and the interval is 0.1 inch.

At least one surface 43 of the connecting belt 4 is provided with a plurality of position marks 41, the scale mark 41 includes a scale mark which includes a scale line 411 and a figure mark 413 corresponding to the scale line 411. The scale line 411 and the figure mark 413 are formed on the surface 43 by printing.

Figure 5:
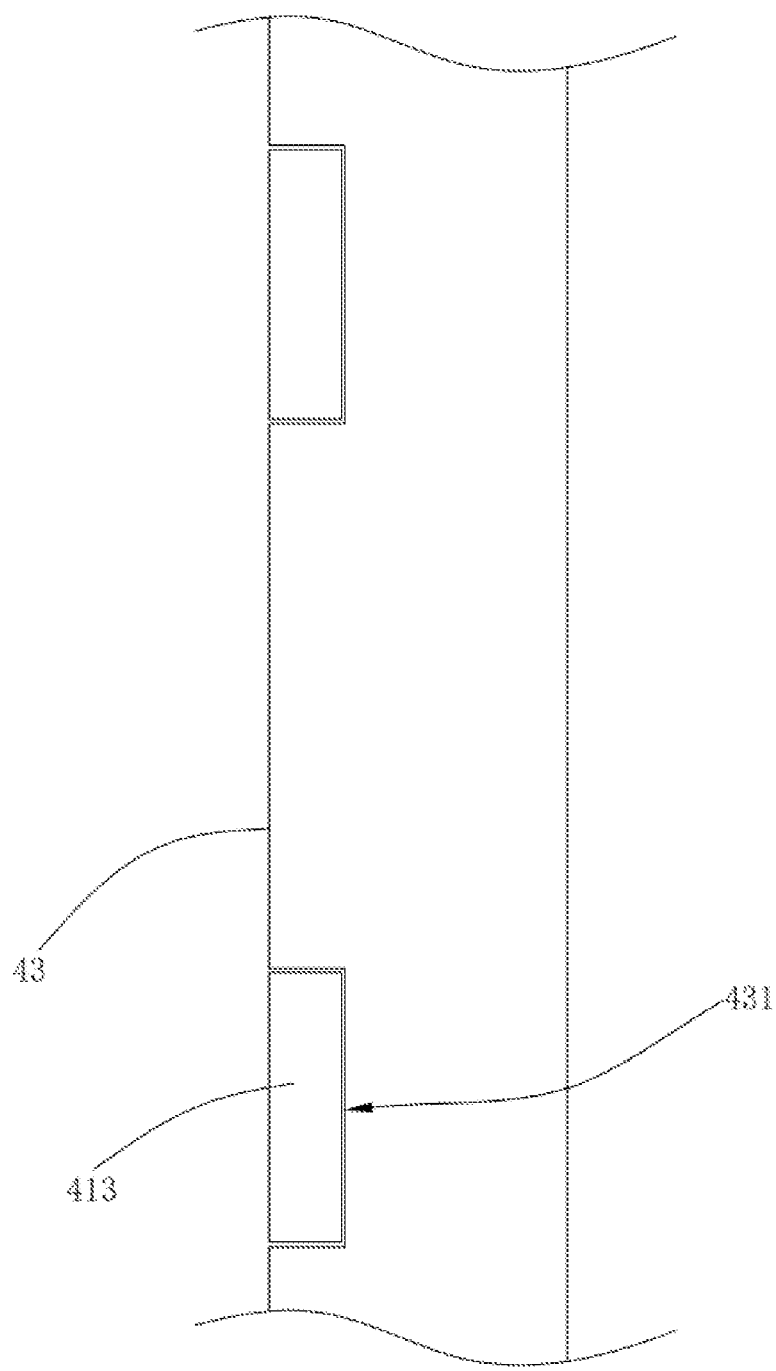
FIG. 5 is a structure diagram of a dog vest according to a second embodiment of the present disclosure.

Please referring to FIG. 5, the differences between the second embodiment and first embodiment include: the surface 43 defines a groove 431, and the scale line 411 or/and figure mark 413 are filled in the groove 431. In particular, the scale line 411 or/and the figure mark 413 may be formed by filling the groove 431 with pigments, and the scale line 411 and figure mark 413 formed in this way are not only more eye-catching but also not easy to be erased, compared with the scale line 411 and figure mark 413 formed in printing.

The difference between the third embodiment and the first embodiment includes: both the scale line 411 and the figure mark 413 are convex patterns formed on the surface 43. Specifically, the convex patterns can be formed on the surface 43 by sewing, and the scale line 411 and figure mark 413 formed in this way are not only more eye-catching but also not easy to be erased, compared with the scale line 411 and figure mark 413 formed by printing, and the friction between the first adjusting member 5 and the second adjusting member 6 is also increased, thus the reliabilities of the connections between the connecting belt 4 and the first adjusting member 5 and the second adjusting member 6 are improved. It can be understood that, in other embodiments, for the cortex connecting belt, the scale line 411 and the figure mark 413 can also be concave patterns formed in the surface 43, the concave patterns can be formed by laser engraving or stamping; alternatively, one of the scale line 411 and the figure mark 413 is a convex pattern formed on the surface 43, and the other is a concave pattern formed in the surface 43.

It should also be noted that, in other embodiments, the scale mark 41 may be a blocking member or a positioning member. Accordingly, the first adjusting member 5 and the second adjusting member 6 may be a positioning member or a blocking member that forms a buckle structure with the scale mark 41. That is, the blocking member and the positioning member can jointly form the buckle structure. In detail, when the positioning member passes through the blocking member, an acting force that is felt or heard by user between the positioning member and the blocking member is configured to indicate the length of the connecting belt.

Specifically, the buckle structure may be as a slidable buckle, when adjusting the length of the connecting belt, the length can be adjusted conveniently by listening to the number of snapping sounds of the slidable buckle. That is, "blind adjusting", which is very convenient when the adjusting positions of the connecting belt are at the back of the user, or the adjusting positions are in poorly lit area or difficult to reach.

It should also be noted that, for different wearable products, the minimum adjusting lengths of the connecting belts may be different. That is to say, for different wearable products, the intervals between the scale marks of the connecting belt shall be designed according to the minimum adjusting length. For example, for the products using short connecting belt, such as watch with woven belt, and wrist strap, the minimum adjusting length of the connecting belt is usually small, usually set to the millimeter level (that is, the interval between the adjacent scale marks is usually set to the millimeter level), so that the woven belt of the watch and the wrist strap can be adjusted more appropriately. For the products using long connecting belt, such as the safety belt of the parachute, the minimum adjusting length is usually large, usually set to the decimeter level (that is, the interval between the adjacent scale marks is usually set to the decimeter level), so that the safety belt can be easily adjusted to the required length. Of course, in order to meet the minimum adjusting length requirements of most the wearable products, the interval between the adjacent scale marks is usually set to 0.1 cm. Therefore, the minimum adjustment lengths of millimeter level and decimeter level are suitable for most products.

Figure 6:
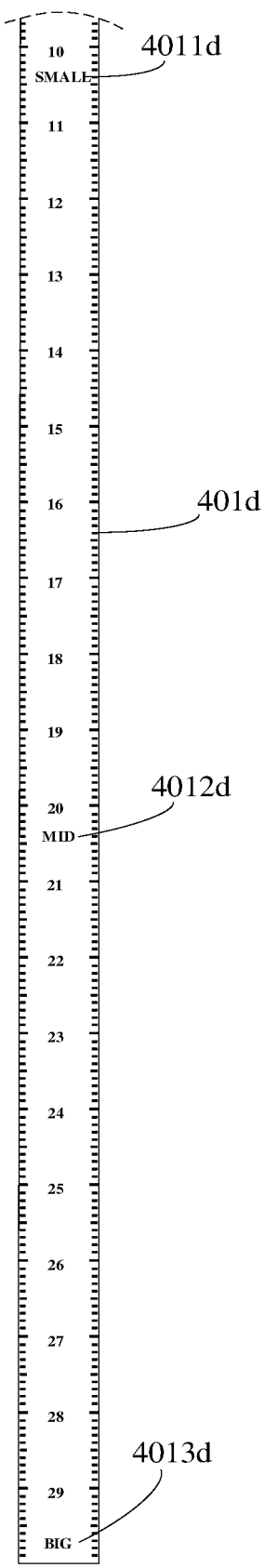
FIG. 6 is a structure diagram of a connecting belt for a pet vest according to a fourth embodiment.

Referring to FIG. 6, the present disclosure further provides a connecting belt 4d for a pet vest according to a fourth embodiment. The connecting belt 4d is provided with some size marks 401d, including a first size mark 4011d for a puppy, a second size mark 4011d for a medium size dog, and a third size mark 4011d for a big dog. The connecting belt 4d has a length of about 30 inches, and a width of about 0.5-2 inches. In an embodiment, the connecting belt 4d further includes two lines of scale lines and figure marks arranged between the scale lines. The scale lines may be protruded on the connecting belt 36 or recessed in the connecting belt 36.

Figure 7:
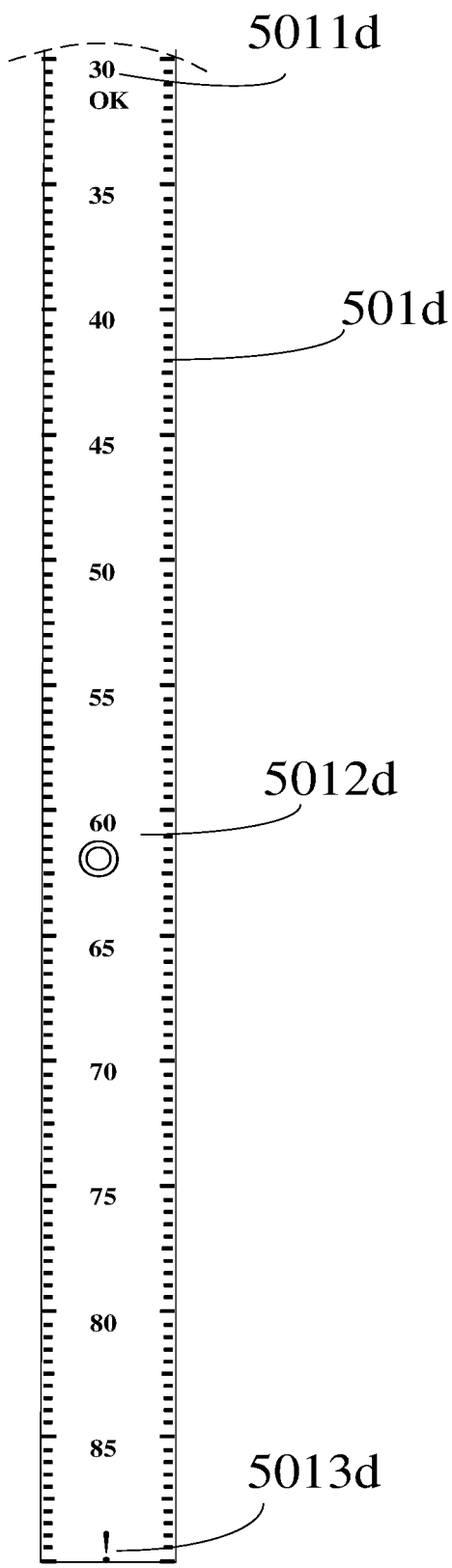
FIG. 7 is a structure diagram of a leash for a pet vest according to a fifth embodiment.

Referring to FIG. 7, the present disclosure further provides a leash 5e for a pet vest according to a fifth embodiment, the leash 5e has some distance marks 501d, including a safe distance mark 5011d which is about 30 inches and may be shown in green, an acceptable distance mark 5012d which is about 60 inches and may be shown in yellow, and a hazard distance mark 5013d which is about 90 inches and may be shown in red and the leach 5e. The leash 5e in a full extension state has a length of about 90 inches, and a width of about 0.5-2 inches.

Figure 8:
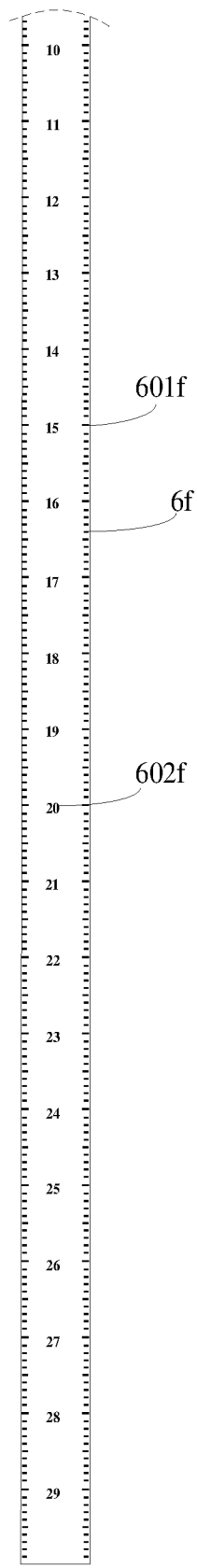
FIG. 8 is a structure diagram of a safety belt for a personal fall protection system according to a sixth embodiment.

Referring to FIG. 8, the present disclosure further provides a safety belt 6f for a personal fall protection system according to a sixth embodiment, the safety belt 6f is provided with scale lines 601f and figure marks 602f, so user can easily adjust the left safety belt and the right safety belt to have the same length.

Figure 9:
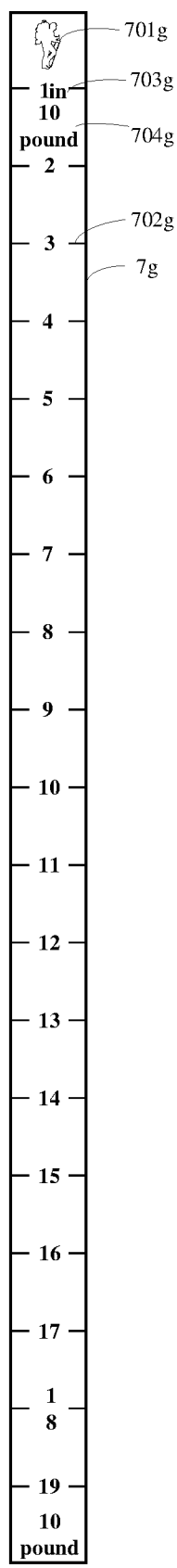
FIG. 9 is a structure diagram of a belt for a hiking backpack according to a seventh embodiment.

Referring to FIG. 9, the present disclosure further provides a belt 7g for a hiking backpack according to a seventh embodiment, the belt 7g has a width of about 0.5-2 inches. In one embodiment, the belt 7g has a width of 1 inch, and suitable for a hiking backpack with a maximum load of about 10 pounds. It should be understood that, the belt 7g may have different widths, for example, the belt 7g may be arranged to have a width of about 2 inches to be used to a backpack with a maximum load of about 20 pounds, the belts 7g may be arranged to have a width of about 3 inches to be used to a backpack with a maximum load of about 30 pounds, and the belts 7g may be arranged to have a width of about 4 inches to be used to a backpack with a maximum load of about 40 pounds. The belt 7g has a pattern 701g including a mountaineer and backpack, scale lines 702g, figure marks 703g, and a weight mark 704g. The figure mark 1 can also be used to indicate the width of the belt 7g.

Figure 10:
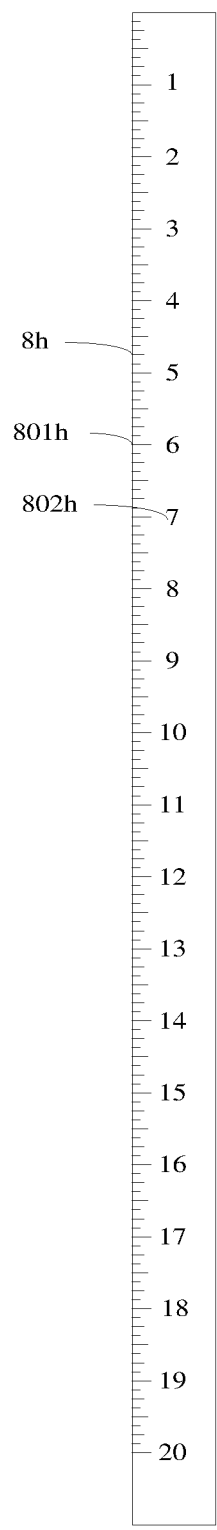
FIG. 10 is a structure diagram of a belt for a children's backpack according to an eight embodiment.

Referring to FIG. 10, the present disclosure further provides a belt 8h for a children's backpack according to an eight embodiment, the length of the belt 8h can be adjusted according to the height of the teenager. So the teenager can use the backpack correctly. The belt 8h has scale lines 801h and figure marks 802h.

Figure 11:
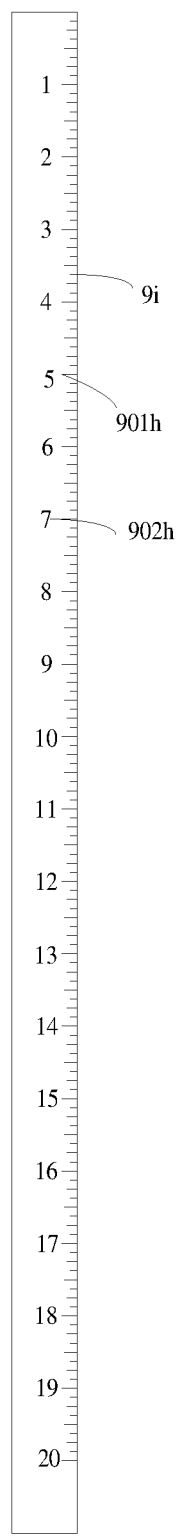
FIG. 11 is a structure diagram of a belt for a military backpack according to a ninth embodiment.

Referring to FIG. 11, the present disclosure further provides a belt 9i for a military backpack according to a ninth embodiment. User can adjust the belt 9i according his height and weight.

Figure 12:
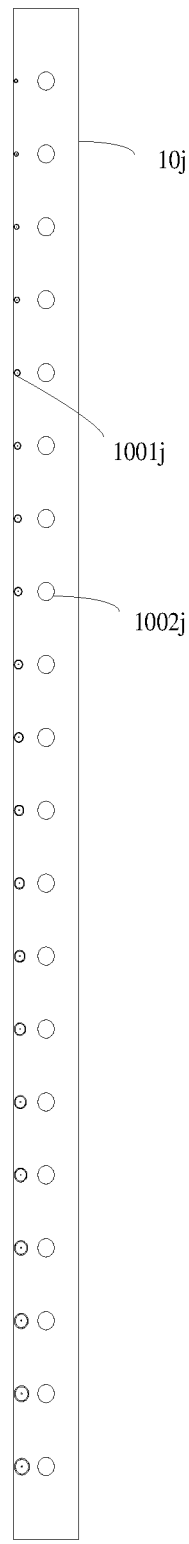
FIG. 12 is a structure diagram of a belt for a watch or a wrist strap according to a tenth embodiment.

Referring to FIG. 12, the present disclosure further provides a belt 10j for a watch or a wrist strap according to a tenth embodiment. User can adjust the belt 10j according his height and weight. The belt 10j includes a plurality of protrusions 1001j and a plurality of holes 1002j, sizes of the protrusions 1001j gradually increase in a length direction of the belt 10j. In detail, heights of the protrusions 1001j gradually increase in the length direction of the belt 10j; or diameters of the protrusions 1001j gradually increase in the length direction of the belt 10j. User can adjust the length of the belt 10j according to the sizes of the protrusions without looking at the belt 10j. The hole 1002j or protrusion 1001j may be circular shaped, square shaped, trapezoidal shaped, or irregular shaped.

Figure 13:
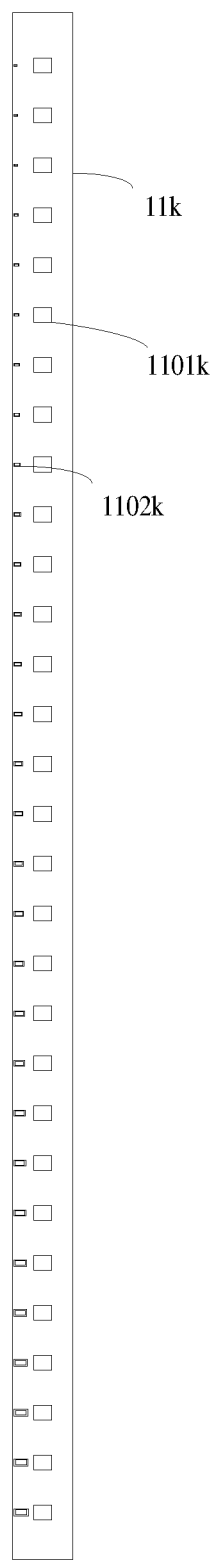
FIG. 13 is a structure diagram of a belt for a girdle according to an eleventh embodiment.

Referring to FIG. 13, the present disclosure further provides a belt Ilk for a girdle according to an eleventh embodiment. The belt 11k includes a plurality of protrusions 1101k and a plurality of holes 1102k, sizes of the protrusions 1101k gradually increase in a length direction of the belt 11k. In detail, heights of the protrusions 1101k gradually increase in the length direction of the belt 11k; or diameters of the protrusions 1101k gradually increase in the length direction of the belt 11k. User can adjust the length of the belt 11k according to the sizes of the protrusions 1101k without looking at the belt 11k. The hole 1102k or protrusion 1101k may be circular shaped, square shaped, trapezoidal shaped, or irregular shaped.

The above description is merely some embodiments. It should be noted that for one with ordinary skills in the art, improvements can be made without departing from the concept of the present disclosure, but these improvements shall fall into the protection scope of the present disclosure.

What is claimed is:

1. A pet vest, comprising a body and a pair of connecting belts connected with the body, wherein each connecting belt of the pair of connecting belts comprises:
   a plurality of position marks, an interval is defined between each two adjacent position marks, and the intervals are arranged along a length direction of the connecting belt and configured to mark a length of the connecting belt when adjusting;
   wherein one of the pair of connecting belts comprises a first adjusting member configured to adjust the length of the first connecting belt; and the body comprises a first detachable member, the first detachable member is connected with the one of the pair of connecting belts;
   wherein the body comprises a back portion and an abdomen portion, one of the back portion and the abdomen portion comprises the first detachable member, and the other one of the back portion and the abdomen portion is connected with the one of the pair of connecting belts; and
   wherein the back portion is further fixedly arranged with at least one lifting ring, configured to guide a pet wearing the pet vest.

2. The pet vest according to claim 1, wherein the intervals are the same or different.

3. The pet vest according to claim 1, wherein the position mark comprises a scale mark, the scale mark comprises a scale line and a figure mark corresponding to the scale line, the scale line and the figure mark are formed on at least one surface of the connecting belt.

4. The pet vest according to claim 3, wherein
   the scale line and the figure mark are printed on the at least one surface of the connecting belt; or
   the scale line is a convex pattern or a concave pattern formed on the at least one surface of the connecting belt; or
   the figure mark is a convex pattern or a concave pattern formed on the at least one surface of the connecting belt.

5. The pet vest according to claim 3, wherein the at least one surface defines a plurality of grooves, the scale lines or the figure marks are filled in the grooves.

6. The pet vest according to claim 1, wherein
   the pair of connecting belts are symmetrically connected with the back portion or the abdomen portion.

7. The pet vest according to claim 1, wherein
   the position mark is a blocking member, and the first adjusting member is a positioning member, and when the positioning member passes through the blocking member, an acting force that is felt or heard by user between the positioning member and the blocking member is configured to indicate the length of the connecting belt; or
   the position mark is a positioning member, and the first adjusting member is a blocking member, when the positioning member passes through the blocking member, an acting force that is felt or heard by user between the positioning member and the blocking member is configured to indicate the length of the connecting belt.

8. The pet vest according to claim 1, wherein
   the other one of the pair of connecting belts comprises a second adjusting member configured to adjust the length of the other one of the pair of connecting belts; and
   the body comprises a second detachable member, the second detachable member is connected with the other one of the pair of connecting belts.

9. The pet vest according to claim 8, wherein the body further comprises a back portion and a neck portion, one of the back portion and the neck portion comprises the second detachable member, and the other one of the back portion and the neck portion is connected with the other one of the pair of connecting belts.

10. The pet vest according to claim 9, wherein the back portion and the neck portion cooperatively enclose a neck ring, an end of the back portion close to the neck ring is fixedly arranged with a connecting ring for connecting a leash, and the connecting ring is configured to evenly distribute a pressure applied from the leash to a chest of a pet wearing the pet vest.

11. The pet vest according to claim 1, wherein,
the body comprises a neck portion, configured to be worn to a neck of a pet, and an abdomen portion, configured to be worn to an abdomen of the pet;
the pair of connecting belts is a pair of neck adjustment belts, and the pet vest further comprises a pair of abdomen adjustment belts; and
each adjustment belt of the pair of abdomen adjustment belts is capable of being adjusted from two ends of the adjustment belt.

12. The pet vest according to claim 11, wherein the neck portion defines a receiving space, a free end of each adjustment belt of the pair of neck adjustment belts is received in the receiving space.

* * * * *